(12) United States Patent
Stransky-Heilkron

(10) Patent No.: US 9,313,258 B2
(45) Date of Patent: Apr. 12, 2016

(54) SYSTEM AND METHOD TO MANAGE SWITCHING BETWEEN DEVICES

(71) Applicant: Nagravision S.A., Cheseaux-sur-Lausanne (CH)

(72) Inventor: Philippe Stransky-Heilkron, Cheseaux-sur-Lausanne (CH)

(73) Assignee: Nagravision S.A., Cheseaux-sur-Lausanne (CH)

( * ) Notice: Subject to any disclaimer, the term of this patent is extended or adjusted under 35 U.S.C. 154(b) by 126 days.

(21) Appl. No.: 13/958,366

(22) Filed: Aug. 2, 2013

(65) Prior Publication Data

US 2015/0040023 A1 Feb. 5, 2015

(51) Int. Cl.
| | |
|---|---|
| *G06F 3/00* | (2006.01) |
| *G06F 9/44* | (2006.01) |
| *G06F 9/46* | (2006.01) |
| *G06F 13/00* | (2006.01) |
| *H04L 29/08* | (2006.01) |
| *G06F 3/0482* | (2013.01) |
| *G06F 3/0484* | (2013.01) |
| *H04N 21/436* | (2011.01) |
| *H04N 21/443* | (2011.01) |
| *H04N 21/462* | (2011.01) |
| *H04N 21/472* | (2011.01) |

(52) U.S. Cl.
CPC ............ *H04L 67/025* (2013.01); *G06F 3/0482* (2013.01); *G06F 3/04842* (2013.01); *H04N 21/43615* (2013.01); *H04N 21/443* (2013.01); *H04N 21/4622* (2013.01); *H04N 21/472* (2013.01)

(58) Field of Classification Search
CPC .................................................... G06F 3/0482
USPC ......................................................... 719/323
See application file for complete search history.

(56) References Cited

U.S. PATENT DOCUMENTS

| | | | | |
|---|---|---|---|---|
| 5,760,698 | A | * | 6/1998 | Iijima et al. ................... 340/3.43 |
| 5,883,621 | A | * | 3/1999 | Iwamura ......................... 725/37 |
| 6,321,382 | B1 | * | 11/2001 | Wugofski ........................ 725/59 |

(Continued)

FOREIGN PATENT DOCUMENTS

| | | |
|---|---|---|
| EP | 2383984 A2 | 11/2011 |
| EP | 2453667 A1 | 5/2012 |
| WO | WO-2015015295 A1 | 2/2015 |

OTHER PUBLICATIONS

"International Application Serial No. PCT/IB2014/001644, International Search Report mailed Jan. 12, 2015", 4 pgs.

(Continued)

*Primary Examiner* — Timothy A Mudrick
(74) *Attorney, Agent, or Firm* — Schwegman Lundberg & Woessner, P.A.

(57) ABSTRACT

In example embodiments, a system and method for managing switching between devices are provided. A consolidated catalog of applications available on devices coupled to a master device is maintained. The consolidated catalog of applications is graphically presented on a screen controlled by the master device. A selection of an application from the consolidated catalog of applications is received via a control device. Based on the selected application being located at a device coupled to the master device, input is automatically switched from the master device to the device having the selected application. As a result, a display corresponding to the selected application is presented on the screen.

21 Claims, 6 Drawing Sheets

(56) References Cited

U.S. PATENT DOCUMENTS

| | | | |
|---|---|---|---|
| 6,603,488 B2* | 8/2003 | Humpleman et al. | 715/771 |
| 8,397,255 B2* | 3/2013 | Wachtfogel et al. | 725/34 |
| 2005/0028208 A1 | 2/2005 | Ellis et al. | |
| 2006/0195553 A1* | 8/2006 | Nakamura | 709/219 |
| 2008/0159715 A1* | 7/2008 | Fuasaro et al. | 386/124 |
| 2008/0320539 A1* | 12/2008 | Ohkita | 725/118 |
| 2010/0153885 A1 | 6/2010 | Yates | |
| 2012/0054794 A1 | 3/2012 | Kim et al. | |
| 2012/0317085 A1 | 12/2012 | Green et al. | |
| 2013/0152135 A1* | 6/2013 | Hong et al. | 725/51 |
| 2014/0053222 A1* | 2/2014 | Shoykher et al. | 725/110 |
| 2014/0351870 A1* | 11/2014 | Amine et al. | 725/92 |

OTHER PUBLICATIONS

"International Application Serial No. PCT/IB2014/001644, Written Opinion mailed Jan. 12, 2015", 4 pgs.

* cited by examiner

SYSTEM AND METHOD TO MANAGE SWITCHING BETWEEN DEVICES

FIELD

The present disclosure relates generally to device operations, and in a specific example embodiment, to managing switching between devices.

BACKGROUND

Conventionally, televisions and devices that may connect to televisions comprise one or more applications. For example, an intelligent television may have an application that allows the user to play a radio or access the Internet. Similarly, a set-top box may have applications that provide these features. With digital television, there may be competition between features provided by a paid television operator, via the set-top box, and features that are already available in the television. As a result, there may be identical features and applications on both devices. A user may be confused as to which device to use for an application or which device contains a particular application. Additionally, the user may need to manually choose a proper input port when switching between devices (e.g., between a television and a coupled gaming console) which is oftentimes confusing to the user. Once switched to a new device, the user may need to switch to a dedicated remote control for the new device as well.

BRIEF DESCRIPTION OF DRAWINGS

Various ones of the appended drawings merely illustrate example embodiments of the present invention and cannot be considered as limiting its scope.

DETAILED DESCRIPTION

Figure 1:
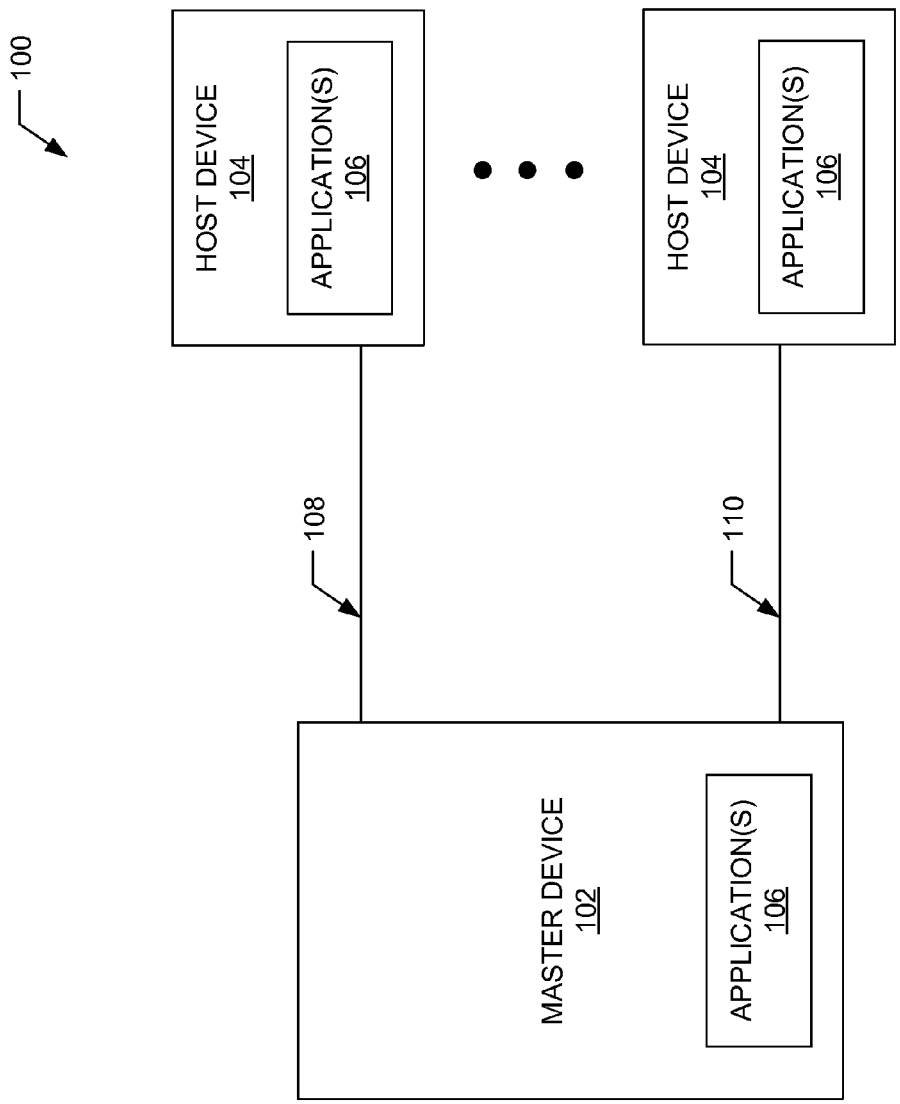
FIG. 1 is a diagram illustrating an example environment in which embodiments of a system for managing switching between devices may be implemented.

The description that follows includes systems, methods, techniques, instruction sequences, and computing machine program products that illustrate embodiments of the present invention. In the following description, for purposes of explanation, numerous specific details are set forth in order to provide an understanding of various embodiments of the inventive subject matter. It will be evident, however, to those skilled in the art that embodiments of the inventive subject matter may be practiced without these specific details. In general, well-known instruction instances, protocols, structures, and techniques have not been shown in detail.

Example embodiments described herein provide systems and methods for managing switching between devices. In example embodiments, a list of all applications available on connected devices is consolidated within a central catalog. The catalog may be located on one of the devices (e.g., a master device) or may be accessible by one or more devices. When a particular application is selected from the catalog, the system may automatically switch control of a screen on a content viewing machine (e.g., television, monitor) to the device having the application that is running. The user does not need to know on which device the application is running or to manually switch to an input port for the device. Instead, the user just switches on a content viewing machine (e.g., television) along with the coupled device(s). The catalog of applications is presented to the user as a list or menu on the screen of the content viewing machine, and the user merely selects one of the applications to launch the application regardless of where the selected application may be located or how the device on which the selected application is located is coupled to the content viewing machine.

From a display point of view, the system knows, from the catalog of applications, which device needs to launch and run the selected application. The system may send a communication to the device that has the selected application installed thereon and await an acknowledgement from the device. The acknowledgement indicates that the device will launch (or is launching) the selected application. In response to receiving the acknowledgement, the system switches input to the device with the selected application that is launched. By switching input, the system is essentially switching control to the device with the selected application. As a result, a display corresponding to the selected application may be presented on the screen of the content viewing machine.

Additionally, the system may redirect remote control keystrokes to those of the selected application. For example, a television remote control device may be used to control a connected Blu-ray player or a gaming console when the corresponding application is controlling the screen. This eliminates the need for multiple remote control devices or for the user to change to a different remote control device with each change of application. The keystrokes are redirected from the television to the device that is running the application in this example. Once redirected, it is the keystrokes (e.g., inputs) of the device that is running the application that are on the remote control device.

With reference to FIG. 1, a diagram illustrating an example environment 100 in which embodiments of a system for managing switching between devices is shown. The environment 100 comprises a master device 102 coupled to a plurality of host devices 104. In example embodiments, the master device 102 operates as a central hub through which the host devices 104 may present their applications. For example, the master device 102 may be a set-top box coupled to host devices 104 such as a television, a DVD player, and a gaming console. In another embodiment, the master device 102 may be an intelligent television (e.g., digital television with Internet capability) that does not require the use of a set-top box. In this embodiment, the host devices 104 such as DVD players and gaming consoles may be directly connected to the intelligent television.

Each of the master device 102 and the host devices 104 comprise one or more applications 106 that may be presented to the user. For example, the applications 106 may include a radio application, gaming application, Internet application (e.g., to access content from the Internet such as the Weather Channel or YouTube), and content playing applications (e.g., digital television application, DVD application, Blu-ray application). Consequently, each host device 104 "hosts" one or more applications 106 that may be presented to the user via the master device 102. According to example embodiments, each of the host devices 104 provides the master device 102 with a list of the applications 106 (e.g., functions and capabilities) available on the host device 104. As a result, the master device 102 maintains a consolidated catalog of all applications 106 available from the master device 102 and the coupled host devices. The master device 102 will be discussed in more detail in connection with FIG. 2 below.

In one embodiment, the master device 102 is coupled to the host devices 104 via a cable (e.g., HDMI cable, Ethernet cable). For example, a connection 108 may be HDMI-1 while a connection 110 may be HDMI-2. Alternative embodiments may contemplate a wireless connection (e.g., WiFi, Bluetooth).

It is noted that the environment 100 shown in FIG. 1 is exemplary. For example, alternative embodiments may comprise any number of host devices 104, each having any number of applications 106. Additionally, any type of coupling or connection may be utilized between the master device 102 and the host devices 104.

Figure 2:
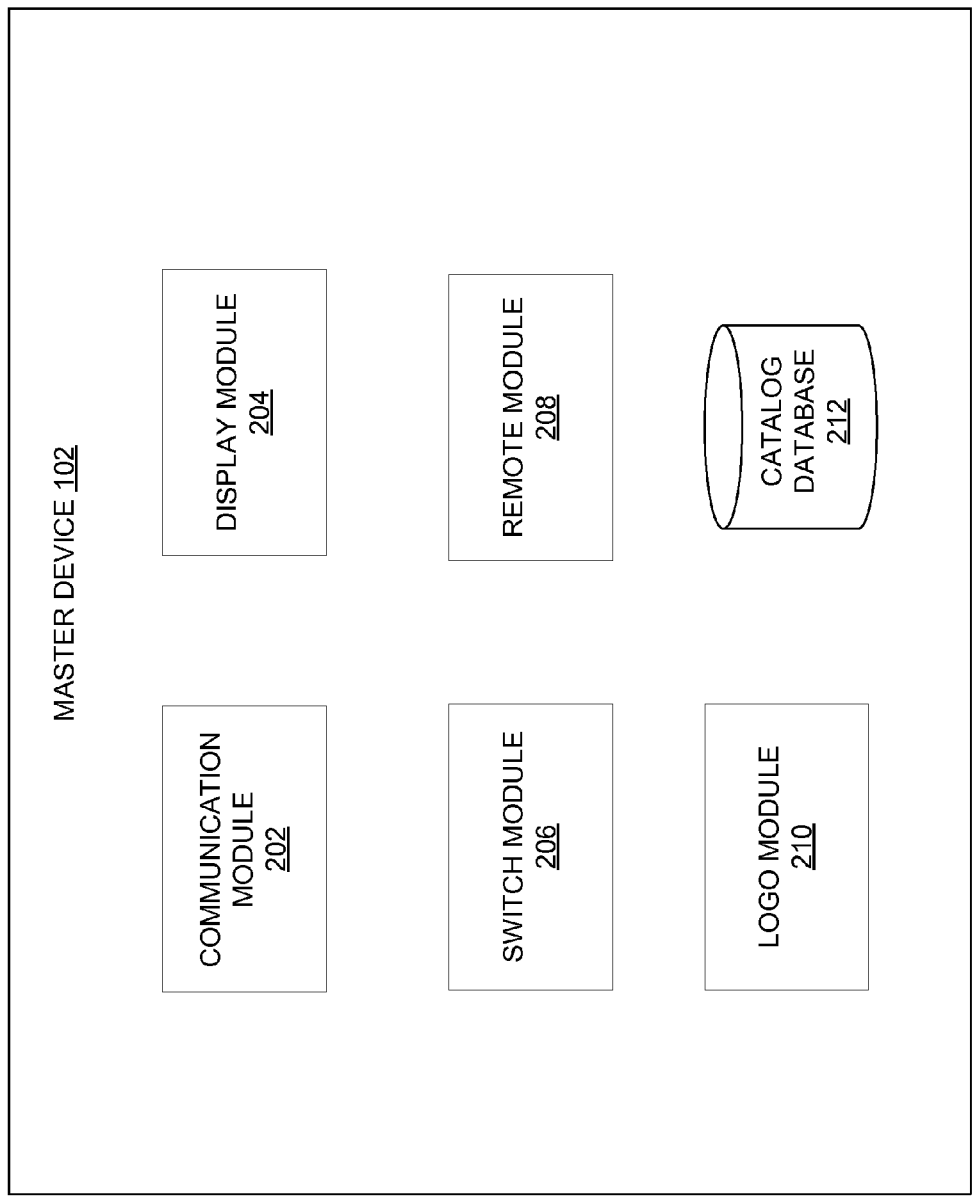
FIG. 2 is a block diagram illustrating an example embodiment of a master device.

Referring now to FIG. 2, a block diagram illustrating an example embodiment of the master device 102 is shown. The master device 102 provides a consolidated catalog of applications from which a user may select an application to run without having to know which device (e.g., master device 102 or host device 104) actually contains the application and without having to manually switch to a correct input port or to the correct device. Upon selection of the application, the master device 102 may trigger the corresponding host device 104 that contains the selected application to launch the application. The master device 102 may also automatically switch a screen associated with the master device 102 to a display corresponding to the selected application. To enable these operations, the master device may comprise a communication module 202, a display module 204, a switch module 206, a remote module 208, a logo module 210, and a catalog database 212.

The communication module 202 manages communications between the master device 102 and each host device 104. Each host device 104 provides different functions, which may be accessible through their applications 106. When the host device 104 connects to the master device 102, the host device 104 sends the master device 102 information including a set of one or more applications that are available on the host device 104. The communication module 202 receives this information and stores the information in the catalog database 212. The information may include a name of the host device 104 (e.g., configured at installation), a name of an application (e.g., a string of characters), and a logo of the application (e.g., GIF or other format).

In one embodiment, Digital Living Network Alliance (DLNA) may provide a framework for communicating capabilities and applications between the devices (e.g., master device 102 and host device 104) by extending this standard such that a master device 102 (e.g., DLNA client) can retrieve a list of applications (e.g., applications 106) for each host device (e.g., DLNA server). For example, a Blu-ray player (host device 104) may be identified by a television (master device 102) as being a DLNA server connected to HDMI-1. This can be implemented, for example, by using DLNA protocol on one side and HDMI Consumer Electronics Control (CEC) on the other side. Thus, the master device and the devices coupled to the master device may exchange information using an extended version of DLNA that is extended by having the DLNA server provide the list of application. Further, the master device and the devices coupled to the master device may exchange information using an extended version of HDMI Consumer Electronics Control (CEC) protocol to provide the list of applications.

By extending DLNA using CEC, an addressing scheme may be used that, for example, eliminates the need for multiple remote control devices. Thus, in one embodiment, the master device and the devices coupled to the master device may exchange information using an extended version of HDMI Consumer Electronics Control (CEC) protocol as an addressing scheme. The CEC protocol assigns to each device that is connected an address (e.g., physical or logical). For example, a set-top box (STB) may be the master device 102 and the television is the host device 104. The television may have an Internet radio application and a YouTube application, which the television wants to inform the STB about. As such, the television may send a message to the STB in the form of: TV-to-STB 0xA0 <Vendor ID> <Define Application> <Application 10>[Application Identification], where "OTV" is the vendor identifier (VendorID) and a command used is "Vendor Command with ID" 0xA0. For example, the message may be:

0x01 0xA0 0x4F 0x54 0x56 0x01 0x52 0x61 0x64 0x69 0x6F (Application 1 Radio)

0x01 0xA0 0x4F 0x54 0x56 0x02 0x59 0x6F 0x75 0x74 0x75 0x62 0x65 (Application 2 YouTube).

Additionally, application logo information may be exchanged. In one embodiment, the HDMI CEC protocol may be extended to allow sending of logos. Alternatively, the HDMI CEC protocol may be extended to predefine a list of "most useful" applications and their logo-10 (e.g., Internet Radio, YouTube). Adding the logo-10 to the protocol tells the STB to display a predefined logo. In yet another embodiment, the HDMI CEC protocol may be extended to allow sending of logos using alternate communication options.

The display module 204 manages a display on a screen associated with the master device 102. The screen may be on the master device 102 if the master device 102 is a television. Alternatively, the screen may be on a content viewing machine (e.g., television, monitor) that is coupled to the master device 102 when the master device 102 is a STB. When a user views a menu of available applications, the display module 204 accesses the catalog database 212 and graphically presents the user with the menu of applications from all devices (e.g., the master device 102 and the host devices 104). In one embodiment, the display module 204 may provide a name of the device (e.g., Samsung television, Blu-ray player, PlayStation3), a name of the application (e.g., Internet radio, DLNA play, Weather Channel) for the device, and a logo corresponding to each application. In an alternative embodiment, the display module 204 may group the applications by device. For example, all applications available for the master device 102 (e.g., Samsung television) may be graphically shown below a header for the master device 102, while all applications for a first host device 104 is shown below a header for the first host device 104, and so forth. Any form or menu for displaying the available applications may be used.

The communication module 202 also receives inputs from a user (e.g., via a remote control for the master device 102). When the user selects an application from the menu, the communication module 202 receives the selection. If the selected application is an application of the master device 102, then the application may be launched by the master device 102 without any switching of control. However, if the selected application is on one of the host devices 104 (e.g., connected via HDMI-1), then the communication module 202 may send a remote execution command to the host device 104 having the selected application. The host device 104 may then provide an acknowledgement message that indicates that the host device 104 will launch the selected application. In response to receiving the acknowledgement message, the switch module 206 automatically switches input and control to the host device 104. For example, the switch module 206 may automatically switch to a corresponding input port to which the device is connected (e.g., switch to HDMI-1). At this point, the application is running on the host device 104 and the application's display is presented on the screen.

Continuing with the HDMI CEC example with the STB and television, the message set to host device 104 may take the form of STB-to-TV 0xA0 "OTV"<Run application> <Application ID>, whereby the television is the host device 104. More specifically, the message may be 0x10 0xA0 0x4F 0x54 0x56 0x10 0x01 (Run Application 1). The application (Application 1, corresponding to the Internet radio on the television) will start and indicate to the television to switch its display to show the application screen for the Internet radio (by using HDMI CEC command 0x04). Thus, the switch module 206 may automatically switch the display to the Internet radio application without any manual remote control inputs. Furthermore, it is noted that application numbers are assigned to each application in the catalog database 212 and these application numbers are used in the message exchanges.

When the Internet radio application ends (e.g., the user decides to turn the radio off), the television that is running its Internet radio application may send another message to the master device 102 (the STB). The message may take a generic form of 0xA0 "OTV" <Application Ended> <Application ID (optional*. In a specific example, the message may be 0x0F 0xA0 0x4F 0x54 0x56 0x1F 0x01 (Application 1 End). The STB will then instruct the television to switch its display to show the STB screen (by sending HDMI CEC command 0x04). Alternatively, the television may remember that the source of the application launch was the STB and send the "ended message" to the STB: TV-to-STB 0xA0 "OTV"<Application Ended> <Application ID (optional)>. Specifically, the message may be 0x01 0xA0 0x4F 0x54 0x56 0x1F 0x01 (Application 1 End).

The remote module 208 manages functions corresponding to a remote control device of the master device 102. When the switch module 206 switches the input to the host device 104, the remote module 208 may also redirect remote control keystrokes on the remote control device of the master device 102 to those of the host device 104. For example, if the master device 102 is an intelligent television, then the remote control device will be that of the intelligent television. However, if the application is running on a DVD player, the keystrokes on the remote control device of the host device 104 will now be for the DVD player running the application. In essence, the user does not need to change the remote control device. The single remote control device of the master device 102 may be used to control any application running on any host device 104 that is coupled to the master device 102.

The logo module 210 manages the logos associated with the master device 102 and the host devices 104. For example, assume the master device 102 is an intelligent television (e.g., Samsung television). When the user turns on the television, the user will be shown a brand or logo associated with the television (e.g., Samsung logo) as well as the corresponding device menu including the catalog of applications. Assume the application selected on the host device 104 is for a Playstation. As a result, the HDMI input is switched to the Playstation. Then, the display may now show branding or a logo for the Playstation. That is, the logo may be automatically changed based on the master device 102 switching to an input for the host device 104 (e.g., HDMI1, HDMI2, or Internet).

The catalog database 212 may be, or is embodied within, a storage device that stores the set of applications and related information for each of the host devices 104. The information may include the name of the host device 104, the application, and the logo for the application. Additionally, the catalog database 212 may include information on a corresponding interface or port the host device 104 is connected to (e.g., HDMI-1, HDMI-2). The catalog database 212 also includes the applications provided by the master device 102, itself. As a result, the catalog database 212 maintains a consolidated application catalog for all devices in the environment.

Figure 3:
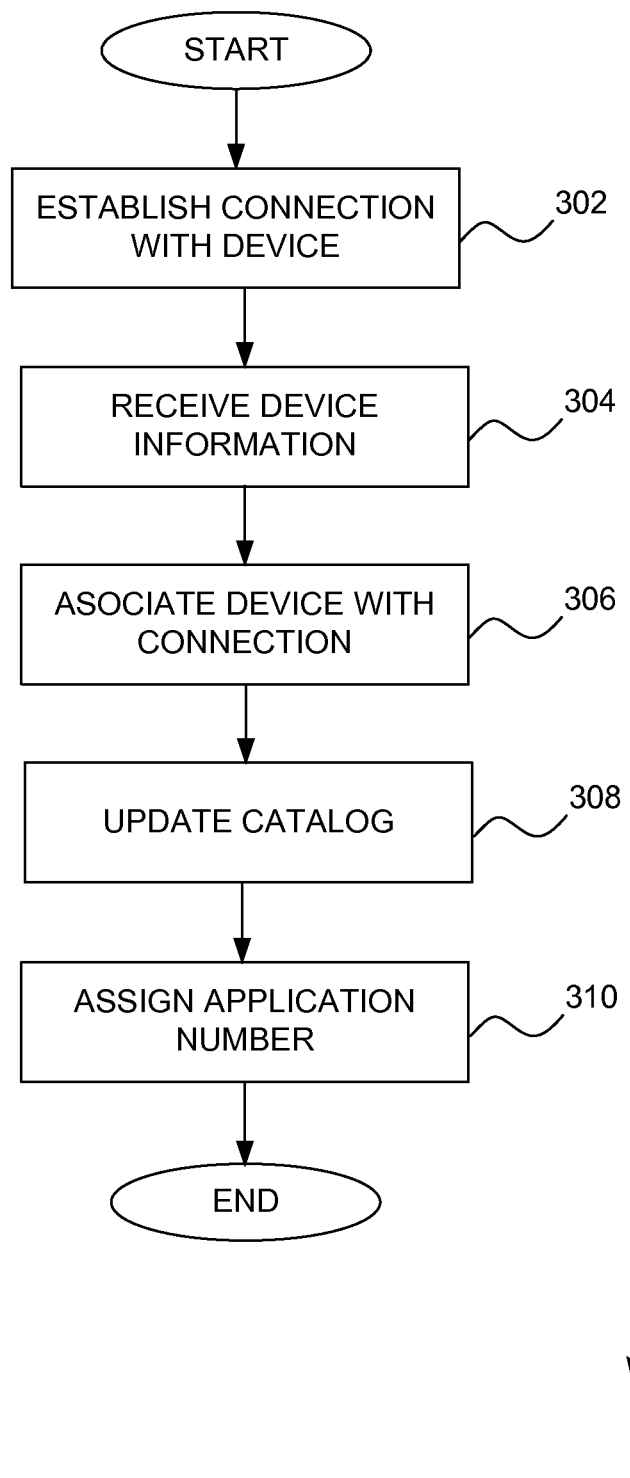
FIG. 3 is a flow diagram of an example method for maintaining a consolidated application catalog.

Referring now to FIG. 3, a flow diagram of an example method 300 for maintaining the consolidated application catalog (e.g., catalog database 212). In operation 302 a connection is established between the master device 102 and the host device 104. In one embodiment, the host device 104 may be connected to an input port of the master device 102 using a cable (e.g., HDMI cable or Ethernet cable). Alternatively, other types of connections may be utilized (e.g., WiFi, Bluetooth).

When the host device 104 connects to the master device 102, the host device 104 sends the master device information regarding itself, which the master device 102 receives in operation 304. The information may include a name of the host device 104 (e.g., Sony Blu-ray player), a name of one or more applications on the host device 104, and an optional logo of the application associated with the host device 104.

In operation 306, the host device 104 may be associated with a connection or input port. For example, the host device 104 may be connected via a HDMI-1 port using an HDMI cable.

The catalog database 212 is updated with the host device 104 information in operation 308. The information may include the name of the host device 104, each application on the host device 104, a corresponding logo for each application if available, as well as connection information (e.g., the input port that the host device 104 is connected to). The catalog database 212 includes all the applications for all of the connected host devices 104 as well as the applications for the master device 102. As such, the consolidated application catalog for all devices, both the master device 102 and the host devices 104, is maintained in the catalog database 212.

In operation 310, an application number may be assigned to each application in the catalog database 212. For example, an Internet radio application on a television may be assigned "Application 1," while a YouTube application on the television maybe assigned "Application 2," and a gaming application on a game console may be assigned "Application 3."

While the method 300 of FIG. 3 discusses the updating of the catalog database 212 based on the host device 104 initially establishing a connection with the master device 102, it is noted that the catalog database 212 may be constantly updated. For example, a host device 104 may have a new application loaded onto the host device 104, and information on this new application may be provided to the master device 102.

Figure 4:
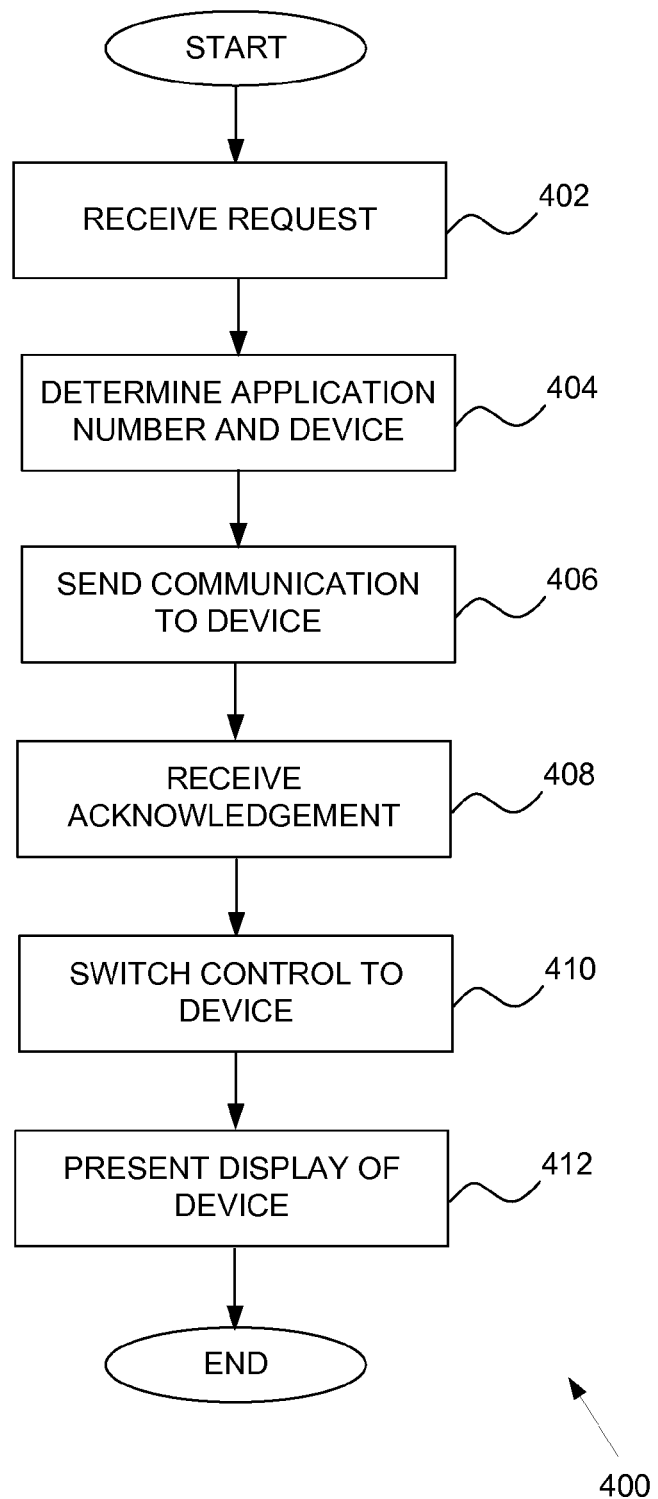
FIG. 4 is a flow diagram of an example method for switching control to a host device.

Referring now to FIG. 4, a flow diagram of an example method 400 for switching control to the host device 104 is shown. The operations of the method 400 may be performed by modules of the master device 102. In operation 402, a request is received from the user to launch an application. For example, the display module 204 may cause a display of all available applications from the consolidated application catalog to be presented to the user on a screen of a content viewing machine. The list of available applications may be retrieved from the catalog database 212 by the display module 204 and graphically presented to the user. The user may, using the remote control device of the master device 102, scroll through the list or menu of the available applications and select one of the applications. The selection is received as the request by the communication module 202.

In operation 404, the master device 102 determines the corresponding application number and device of the selected application. For example, the communication module 202 may access the catalog database 212 and determine the application number of the selected application and the corresponding device. If the application is on the master device 102, then the application is launched and the remainder of the method 400 is not performed. The remainder of the method 400 assumes that the selected application is not an application on the master device 102.

In operation 406, the communication module 202 sends a communication to the host device 104 that has the selected application. In one embodiment, the communication is a remote execution command to the host device 104.

In operation 408, an acknowledgement is received from the host device 104 that has the selected application. In example embodiments, the communication module 202 receives the acknowledgement which indicates that the host device 104 will launch the selected application. In response to the receiving of the acknowledgement, the switch module 206 automatically switches input to the host device 104 (e.g., switch to HDMI-1) in operation 410. At this point, the application is running on the host device 104 and the application's display is presented on the screen in operation 412. Additionally, the remote module 208 may redirect remote control keystrokes on the remote control device to those of the host device 104. As a result, the user does not need to change the remote control device to perform operations with the application on the host device 104.

Figure 5:
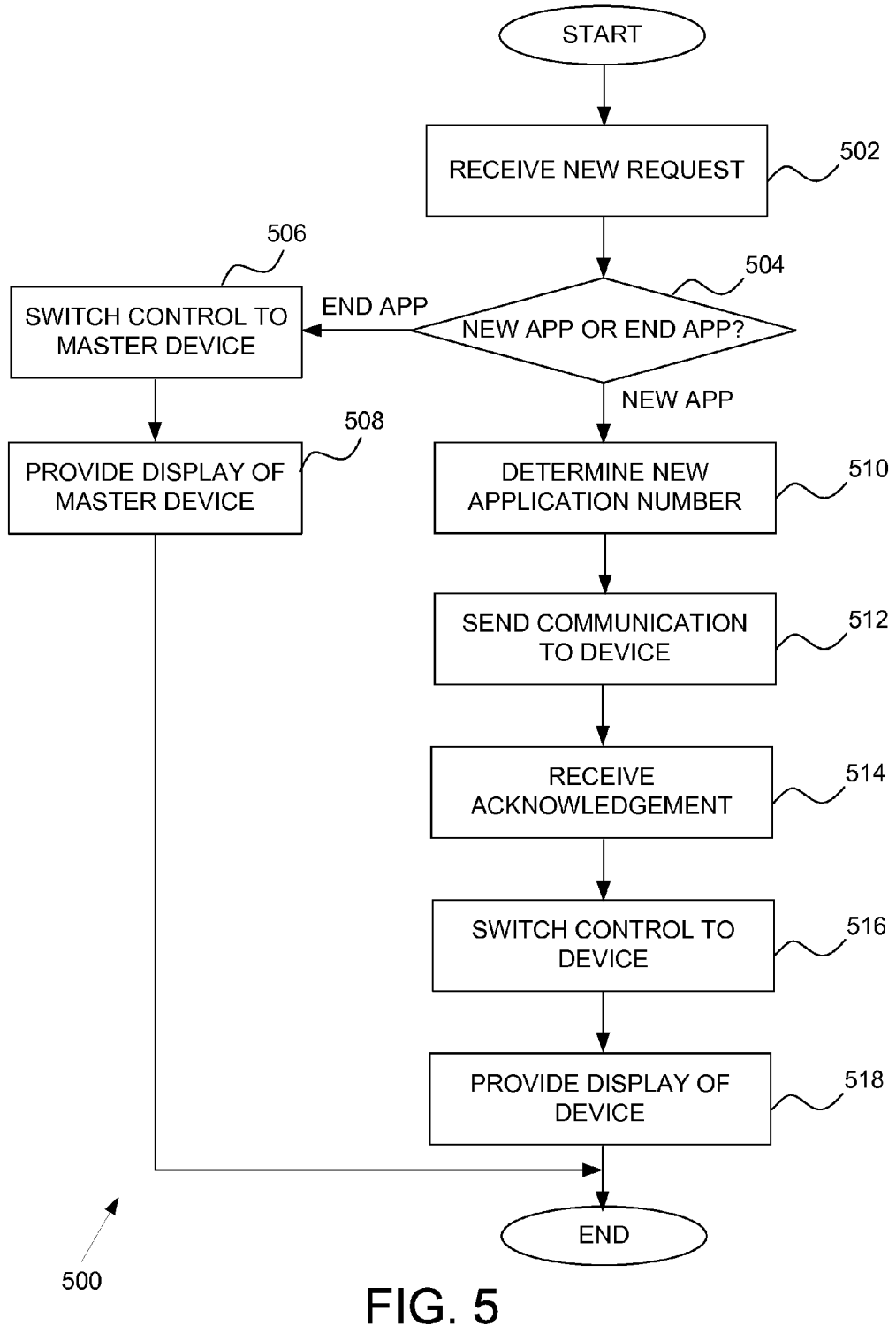
FIG. 5 is a flow diagram of an example method for switching from the host device to an alternative device.

FIG. 5 is a flow diagram of an example method 500 for switching to an alternative device. Assume that the host device 104 of FIG. 4 (herein referred to as "first host device") is providing the application that is currently running. In operation 502, a new request is received from the user. The new request may comprise a request to end the application of the first host device that is currently running or comprise a request to launch a new application on a different device (e.g., on the master device 102 or second host device).

In operation 504, a determination is made as to whether the new request is a request to end the application of the first host device or a request to launch a new application on a different device. If the new request is a request to end the current application of the first host device, control is switched back to the master device 102 in operation 506 and the application on the first host device is terminated. In some embodiments, the switch module 206 via the communication module 202 sends a communication to the first host device to relinquish "command" so that the display may be switched back to the master device 102 (e.g., the STB or the television if there is no STB). After switching control back to the master device 102, the display of the master device 102 is shown on the screen. Additionally, the remote module 208 may redirect remote control keystrokes on the remote control device back to the master device 102.

If the determination in operation 504 is that the request is to launch a new application, then a new application number and the corresponding device is determined in operation 510. For example, the communication module 202 may access the catalog database 212 and determine the application number of the new selected application and the corresponding device. If the new application is on the master device 102, then the application is launched and the remainder of the method 500 is not needed. However, if the new selected application is not an application of the master device 102, then in operation 512, the communication module 202 sends a communication to the second host device that has the new selected application.

In operation 514, an acknowledgement is received from the second host device 104 that has the new selected application. The acknowledgement indicates that the second host device will launch the new selected application. Based on the acknowledgement message, the switch module 206 automatically switches input from the first host device to the second host device (e.g., switch from HDMI-1 to HDMI-2) in operation 516. At this point, the application is running on the second host device and its display is presented on the screen in operation 518. Additionally, the remote module 208 may redirect remote control keystrokes on the remote control device to those of the second host device. As a result, the user does not need to change the remote control device to perform operations with the application on the second host device.

While the method 500 discusses switching to a new application on a different device, it is noted that the new application may be on the same device currently running the present application (e.g., the first host device). In this case, operations 510-514 may still be performed. However, in operation 516, there is no need to switch control to a new device. Instead, the first host device will maintain control and merely launch the new application.

Figure 6:
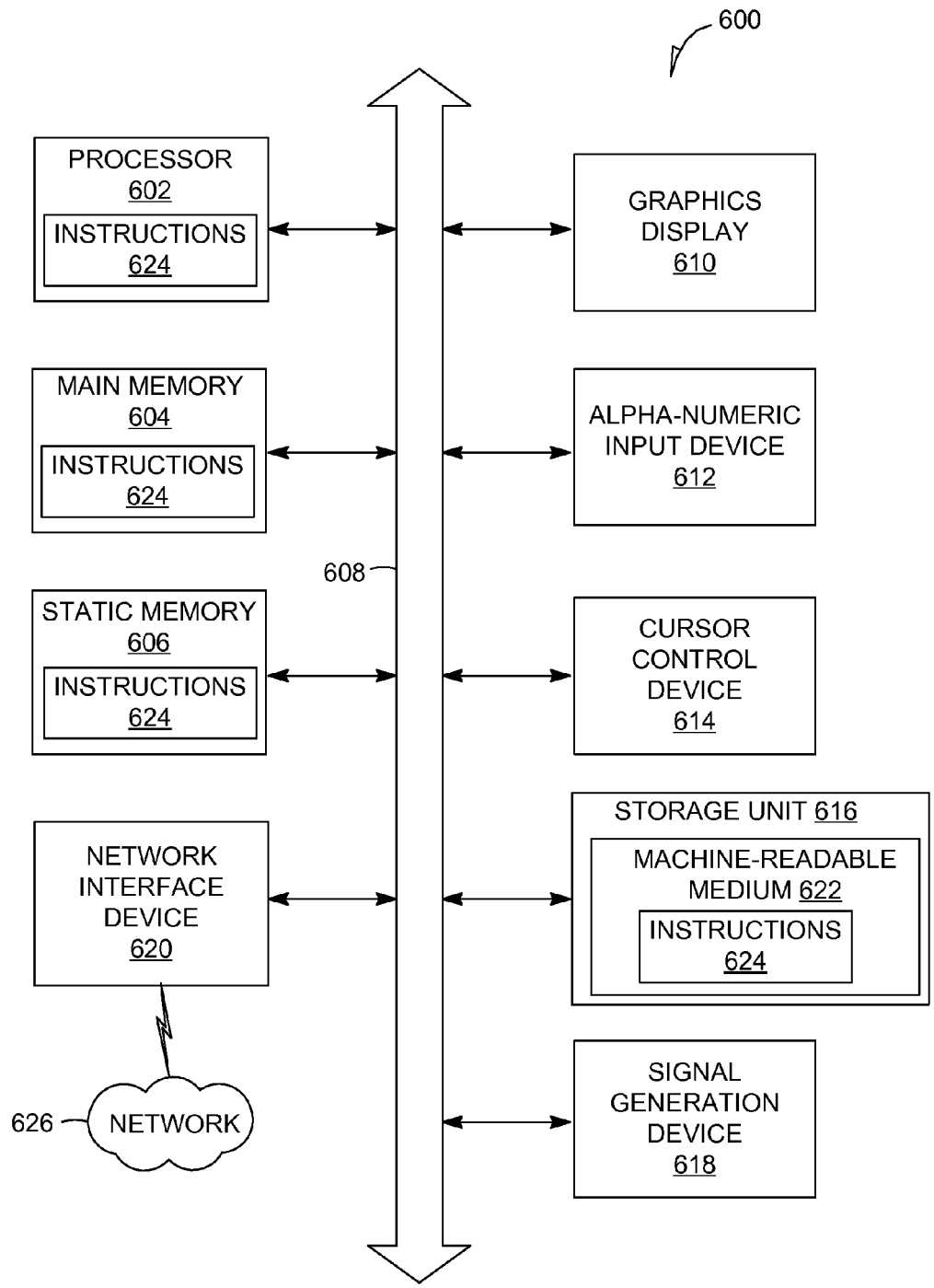
FIG. 6 is a simplified block diagram of a machine in an example form of a computing system within which a set of instructions for causing the machine to perform any one or more of the methodologies discussed herein may be executed.

FIG. 6 is a block diagram illustrating components of a machine 600, according to some example embodiments, able to read instructions from a machine-readable medium (e.g., a machine-readable storage medium) and perform any one or more of the methodologies discussed herein. Specifically, FIG. 6 shows a diagrammatic representation of the machine 600 in the example form of a computer system and within which instructions 624 (e.g., software, a program, an application, an applet, an app, or other executable code) for causing the machine 600 to perform any one or more of the methodologies discussed herein may be executed. In alternative embodiments, the machine 600 operates as a standalone device or may be connected (e.g., networked) to other machines. In a networked deployment, the machine 600 may operate in the capacity of a server machine or a client machine in a server-client network environment, or as a peer machine in a peer-to-peer (or distributed) network environment. The machine 600 may be a server computer, a client computer, a personal computer (PC), a tablet computer, a laptop computer, a netbook, a set-top box (STB), a personal digital assistant (PDA), a cellular telephone, a smartphone, a web appliance, a network router, a network switch, a network bridge, or any machine capable of executing the instructions 624, sequentially or otherwise, that specify actions to be taken by that machine. Further, while only a single machine is illustrated, the term "machine" shall also be taken to include a collection of machines that individually or jointly execute the instructions 624 to perform any one or more of the methodologies discussed herein.

The machine 600 includes a processor 602 (e.g., a central processing unit (CPU), a graphics processing unit (GPU), a digital signal processor (DSP), an application specific integrated circuit (ASIC), a radio-frequency integrated circuit (RFIC), or any suitable combination thereof), a main memory 604, and a static memory 606, which are configured to communicate with each other via a bus 608. The machine 600 may further include a graphics display 610 (e.g., a plasma display panel (PDP), a light emitting diode (LED) display, a liquid crystal display (LCD), a projector, or a cathode ray tube (CRT)). The machine 600 may also include an alpha-numeric input device 612 (e.g., a keyboard), a cursor control device 614 (e.g., a mouse, a touchpad, a trackball, a joystick, a motion sensor, or other pointing instrument), a storage unit 616, a signal generation device 618 (e.g., a speaker), and a network interface device 620.

The storage unit 616 includes a machine-readable medium 622 on which is stored the instructions 624 embodying any one or more of the methodologies or functions described herein. The instructions 624 may also reside, completely or at least partially, within the main memory 604, within the processor 602 (e.g., within the processor's cache memory), or both, during execution thereof by the machine 600. Accordingly, the main memory 604 and the processor 602 may be considered as machine-readable media. The instructions 624 may be transmitted or received over a network 626 via the network interface device 620.

As used herein, the term "memory" refers to a machine-readable medium able to store data temporarily or permanently and may be taken to include, but not be limited to, random-access memory (RAM), read-only memory (ROM), buffer memory, flash memory, and cache memory. While the machine-readable medium 622 is shown in an example embodiment to be a single medium, the term "machine-readable medium" should be taken to include a single medium or multiple media (e.g., a centralized or distributed database, or associated caches and servers) able to store instructions (e.g., instructions 624). The term "machine-readable medium" shall also be taken to include any tangible medium or tangible device, or combination of multiple media, that is capable of storing instructions for execution by a machine (e.g., machine 600), such that the instructions (e.g., instructions 624), when executed by one or more processors of the machine (e.g., processor 602), cause the machine to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory, an optical medium, a magnetic medium, or any suitable combination thereof.

The instructions 624 may further be transmitted or received over a communications network 626 using a transmission medium via the network interface device 620 and utilizing any one of a number of well-known transfer protocols (e.g., HTTP). Examples of communication networks include a local area network (LAN), a wide area network (WAN), the Internet, mobile telephone networks, POTS networks, and wireless data networks (e.g., WiFi and WiMAX networks). The term "transmission medium" shall be taken to include any intangible medium that is capable of storing, encoding, or carrying instructions for execution by the machine 600, and includes digital or analog communications signals or other intangible medium to facilitate communication of such software.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Certain embodiments are described herein as including logic or a number of components, modules, or mechanisms. Modules may constitute either software modules (e.g., code embodied on a machine-readable medium or in a transmission signal) or hardware modules. A "hardware module" is a tangible unit capable of performing certain operations and may be configured or arranged in a certain physical manner. In various example embodiments, one or more computer systems (e.g., a standalone computer system, a client computer system, or a server computer system) or one or more hardware modules of a computer system (e.g., a processor or a group of processors) may be configured by software (e.g., an application or application portion) as a hardware module that operates to perform certain operations as described herein.

In some embodiments, a hardware module may be implemented mechanically, electronically, or any suitable combination thereof. For example, a hardware module may include dedicated circuitry or logic that is permanently configured to perform certain operations. For example, a hardware module may be a special-purpose processor, such as a field programmable gate array (FPGA) or an ASIC. A hardware module may also include programmable logic or circuitry that is temporarily configured by software to perform certain operations. For example, a hardware module may include software encompassed within a general-purpose processor or other programmable processor. It will be appreciated that the decision to implement a hardware module mechanically, in dedicated and permanently configured circuitry, or in temporarily configured circuitry (e.g., configured by software) may be driven by cost and time considerations.

Accordingly, the phrase "hardware module" should be understood to encompass a tangible entity, be that an entity that is physically constructed, permanently configured (e.g., hardwired), or temporarily configured (e.g., programmed) to operate in a certain manner or to perform certain operations described herein. As used herein, "hardware-implemented module" refers to a hardware module. Considering embodiments in which hardware modules are temporarily configured (e.g., programmed), each of the hardware modules need not be configured or instantiated at any one instance in time. For example, where a hardware module comprises a general-purpose processor configured by software to become a special-purpose processor, the general-purpose processor may be configured as respectively different special-purpose processors (e.g., comprising different hardware modules) at different times. Software may accordingly configure a processor, for example, to constitute a particular hardware module at one instance of time and to constitute a different hardware module at a different instance of time.

Hardware modules may provide information to, and receive information from, other hardware modules. Accordingly, the described hardware modules may be regarded as being communicatively coupled. Where multiple hardware modules exist contemporaneously, communications may be achieved through signal transmission (e.g., over appropriate circuits and buses) between or among two or more of the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and may operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions described herein. As used herein, "processor-implemented module" refers to a hardware module implemented using one or more processors.

Similarly, the methods described herein may be at least partially processor-implemented, a processor being an example of hardware. For example, at least some of the operations of a method may be performed by one or more processors or processor-implemented modules. Moreover, the one or more processors may also operate to support performance of the relevant operations in a "cloud computing" environment or as a "software as a service" (SaaS). For example, at least some of the operations may be performed by a group of computers (as examples of machines including processors), with these operations being accessible via a network (e.g., the Internet) and via one or more appropriate interfaces (e.g., an application program interface (API)).

The performance of certain of the operations may be distributed among the one or more processors, not only residing within a single machine, but deployed across a number of machines. In some example embodiments, the one or more processors or processor-implemented modules may be located in a single geographic location (e.g., within a home environment, an office environment, or a server farm). In other example embodiments, the one or more processors or processor-implemented modules may be distributed across a number of geographic locations.

Although an overview of the inventive subject matter has been described with reference to specific example embodiments, various modifications and changes may be made to these embodiments without departing from the broader spirit and scope of embodiments of the present invention. Such embodiments of the inventive subject matter may be referred to herein, individually or collectively, by the term "invention" merely for convenience and without intending to voluntarily limit the scope of this application to any single invention or inventive concept if more than one is, in fact, disclosed.

The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present invention. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present invention as represented by the appended claims. The specification and drawings are, accordingly, to be regarded in an illustrative rather than a restrictive sense.

What is claimed is:

1. A method comprising:
    maintaining a consolidated catalog of applications available on a plurality of devices coupled to a master device;
    causing a graphical presentation of the consolidated catalog of applications on a screen controlled by the master device;
    receiving a selection of an application from the consolidated catalog of applications via a control device;
    sending a communication to device having the selected application that triggers the device having the selected application to launch the selected application;
    receiving an acknowledgement from the device having the selected application regarding launching the selected application;
    in response to receiving the acknowledgement, automatically switching, using a processor of a machine, input and control from the master device to the device having the selected application;
    automatically redirecting remote control keystrokes of the control device to keystrokes of the device having the selected application; and
    causing presentation of a display corresponding to the selected application on the screen.

2. The method of claim 1, wherein the maintaining of the consolidated catalog comprises receiving device information from each device of the plurality of devices coupled to the master device, the device information including a device name and a list of one or more applications on each device.

3. The method of claim 2, wherein the device information further includes a logo corresponding to each application.

4. The method of claim 1, further comprising associating each of at least some of the plurality of devices coupled to the master device with an input port of the master device, the consolidated catalog maintaining information regarding the associated input port for each of the at least some of the plurality of devices,
    wherein the automatically switching input and control comprises automatically switching to a corresponding input port to which the device with the selected application is connected.

5. The method of claim 1, wherein the maintaining of the consolidated catalog comprises assigning an application number to each application in the consolidated catalog, the application number being used in communications involving the master device.

6. The method of claim 1, wherein the sending the communication to the device having the selected application comprises sending a remote execution command to the device having the selected application to launch the selected application.

7. The method of claim 1, further comprising:
    receiving a new request, the new request indicating an end of the selected application;

in response to the new request, sending a communication to the device having the selected application to relinquish command; and automatically switching input and control from the device having the selected application back to the master device.

8. The method of claim 1, further comprising:

receiving a new request, the new request indicating a selection of a new application;

sending a communication to a new device having the new application that triggers the new device to launch the new application;

receiving an acknowledgement from the new device indicating that the new device will launch the new application; and in response to receiving the acknowledgement, automatically switching input and control from the device having the selected application to the new device having the new application.

9. The method of claim 1, wherein the master device and the plurality of devices coupled to the master device exchange information using an extended version of Digital Living Network Alliance (DLNA) that is extended by having the DLNA server providing a list of applications.

10. The method of claim 1, wherein the master device and the plurality of devices coupled to the master device exchange information using an extended version of HDMI Consumer Electronics Control (CEC) protocol to provide a list of applications.

11. The method of claim 1, wherein the master device and the plurality of devices coupled to the master device exchange information using an extended version of HDMI Consumer Electronics Control (CEC) protocol as an addressing scheme.

12. The method of claim 1, wherein the master device is a set-top box that controls the screen of a coupled content viewing machine.

13. The method of claim 1, wherein the master device is an intelligent television.

14. A machine-readable storage medium having no transitory signals and storing instructions which, when executed by at least one processor of a machine, cause the machine to perform operations comprising:

maintaining a consolidated catalog of applications available on a plurality of devices coupled to a master device;

causing a graphical presentation of the consolidated catalog of applications on a screen controlled by the master device;

receiving a selection of an application from the consolidated catalog of applications via a control device;

sending a communication to a device having the selected application that triggers the device having the selected application to launch the selected application;

receiving an acknowledgement from the device having the selected application regarding launching the selected application;

in response to receiving the acknowledgement, automatically switching input and control from the master device to the device having the selected application;

automatically redirecting remote control keystrokes of the control device to keystrokes of the device having the selected application; and causing presentation of a display corresponding to the selected application on the screen.

15. The machine-readable storage medium of claim 14, wherein the sending the communication to the device having the selected application comprises sending a remote execution command to the device having the selected application to launch the selected application.

16. A system comprising:

a processor of a machine;

a catalog database to maintain a consolidated catalog of applications available on a plurality of devices coupled to a master device;

a display module to cause graphical presentation of the consolidated catalog of applications on a screen controlled by the master device;

a communication module to receive a selection of an application from the consolidated catalog of applications via a control device and to send a communication to a device having the selected application, the communication triggering the device having the selected application to launch the selected application;

a switch module to, in response to receiving an acknowledgement from the device having the selected application regarding launching the selected application, automatically switch, using the processor of the machine, input and control from the master device to the device having the selected application, the display module to cause presentation of a display corresponding to the selected application on the screen; and a remote module to automatically redirect remote control keystrokes of the control device to keystrokes of the device having the selected application.

17. The system of claim 16, wherein the communication module is further to receive device information from each device of the plurality of devices coupled to the master device, the device information including a device name and a list of one or more applications on each device.

18. The system of claim 16, wherein:

the consolidated catalog maintains information on an input port of the master device associated with each of at least some of the plurality of devices coupled to the master device, and the switch module is to automatically switch input and control by switching to a corresponding input port to which the device with the selected application is connected.

19. The system of claim 16, wherein the communication sent to the device having the selected application comprises a remote execution command to the device having the selected application to launch the selected application.

20. A method comprising:

maintaining a consolidated catalog of applications available on a plurality of devices coupled to a set-top box;

causing a graphical presentation of the consolidated catalog of applications on a screen controlled by the set-top box;

receiving a selection of an application from the consolidated catalog of applications via a control device;

sending a communication to a device having the selected application that triggers the device having the selected application to launch the selected application;

receiving an acknowledgement from the device having the selected application regarding launching the selected application;

in response to receiving the acknowledgement, automatically switching, using a processor of a machine, input and control from the set-top box to the device having the selected application; and causing presentation of a display corresponding to the selected application on the screen.

21. A system comprising:

a processor of a machine;

a catalog database to maintain a consolidated catalog of applications available on a plurality of devices coupled to a set-top box;

a display module to cause graphical presentation of the consolidated catalog of applications on a screen controlled by the set-top box;

a communication module to receive a selection of an application from the consolidated catalog of applications via a control device and to send a communication to a device having the selected application, the communication triggering the device having the selected application to launch the selected application; and a switch module to, in response to receiving an acknowledgement from the device having the selected application regarding launching the selected application, automatically switch, using the processor of the machine, input and control from the set-top box to the device having the selected application, the display module to cause presentation of a display corresponding to the selected application on the screen.

* * * * *